April 16, 1946.  A. M. STONER  2,398,564
METHOD OF MAKING CHUCKS
Filed March 10, 1943  2 Sheets-Sheet 1
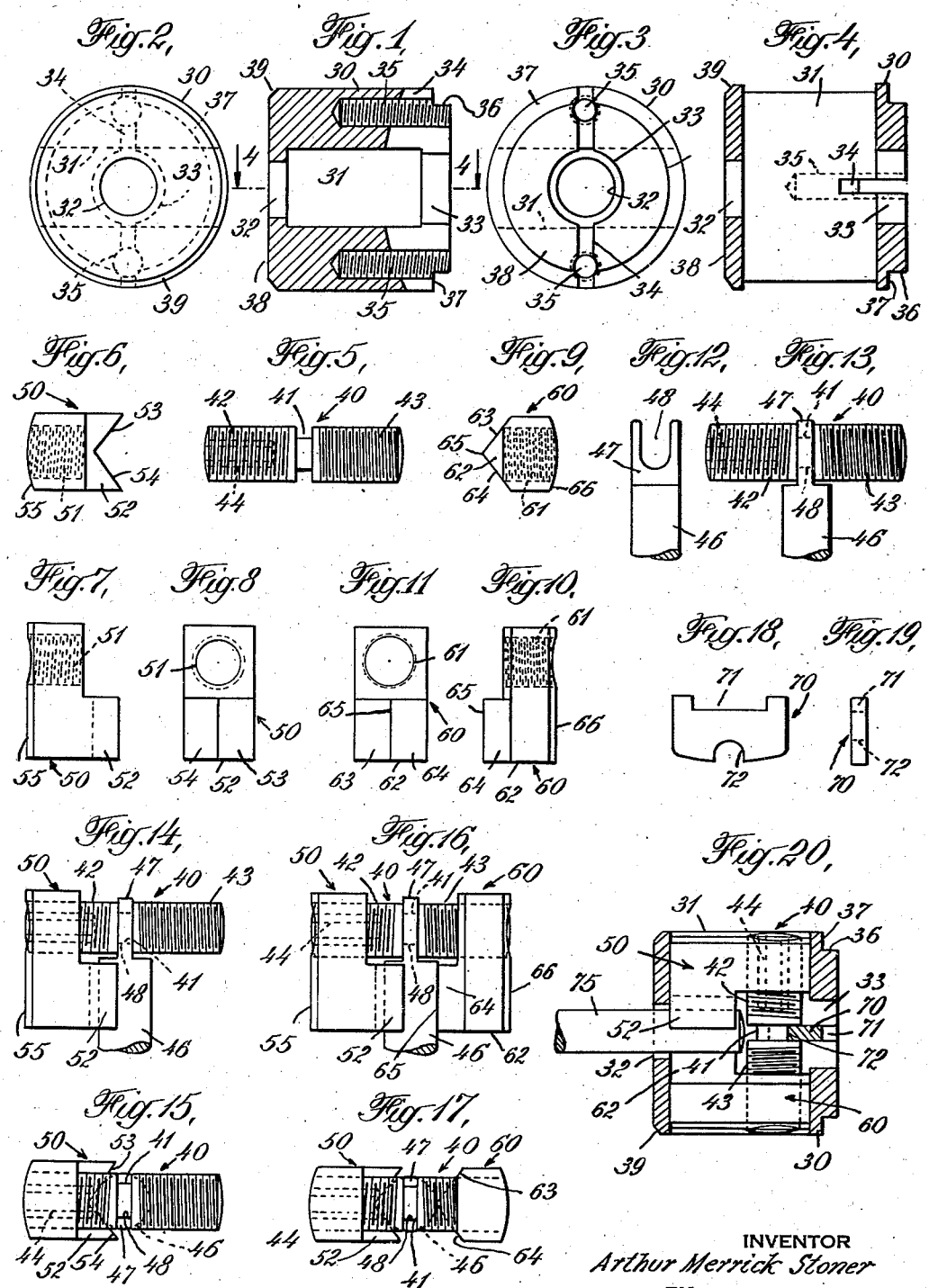
INVENTOR
Arthur Merrick Stoner
BY
E. W. Marshall
ATTORNEY

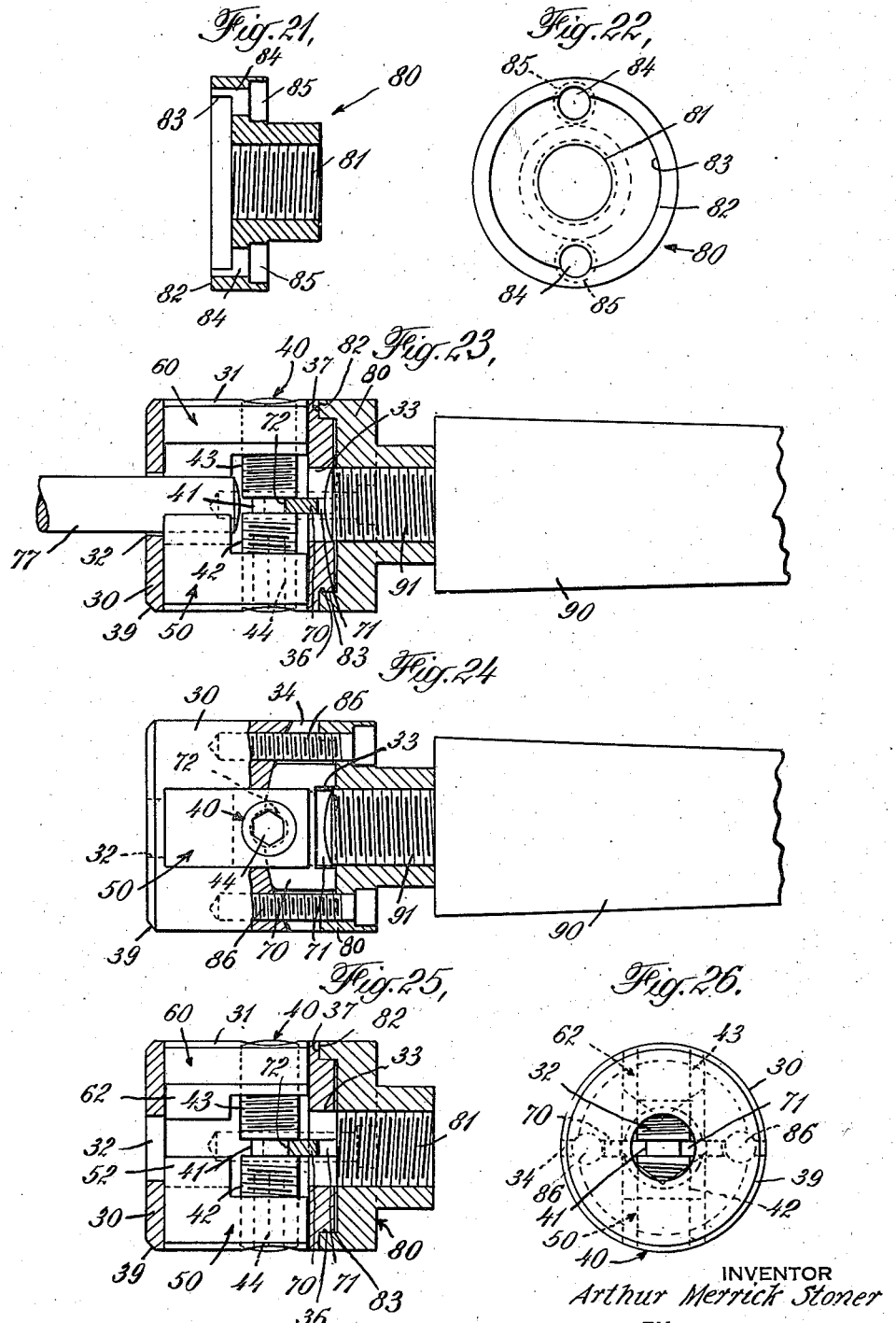

Patented Apr. 16, 1946

2,398,564

UNITED STATES PATENT OFFICE 2,398,564

METHOD OF MAKING CHUCKS

Arthur Merrick Stoner, West Hartford, Conn., assignor to The Jacobs Manufacturing Company, Hartford, Conn., a corporation of Connecticut Application March 10, 1943, Serial No. 478,639

9 Claims. (Cl. 29—148)

This invention relates to a novel method of making chucks. Its object is to provide a way of centralizing the clamping jaw supporting parts of a chuck in relation to the jaws instead of centralizing the jaws in relation to their supporting parts to thereby insure the proper axial alinement of the driving parts of a chuck and the tool or article driven thereby and to lessen the cost of production.

According to former practice a rotatable chuck body has been provided with means for attaching it to a spindle or other part of a machine or tool for driving it and adjustable clamping jaws with actuating mechanism therefor have been mounted in the body in such a way as to make the axis of rotation of an article or tool engaged by the chuck as near as possible to the axis of rotation of the body. This has entailed the most careful location of the jaws themselves, of various parts of the jaw actuating mechanism, and of the parts of the body in which the actuating mechanisms were supported. Sometimes arrangements have been provided for adjusting the position of each jaw individually in its relation to the body to attain the desired result.

According to this invention these difficult niceties are obviated. I propose to mount an adjustable jaw assembly in the approximate center of a chuck body, to clamp the body onto a true running shaft by the jaws therein and then true up the body to make it concentric with the axis of the shaft on which it is thus supported.

I will describe my invention in the following specification and will point out its novel features in the appended claims.

Referring to the drawings:

Fig. 1 is a sectional side elevation of a chuck body which is used in carrying out my invention as applied to make a chuck of simple construction;

Fig. 2 is a front elevation and Fig. 3 a rear elevation of the chuck body as shown in Fig. 1;

Fig. 4 is a sectional plan view of the chuck body, the section being taken on the line 4—4 of Fig. 1;

Fig. 5 is an elevation of an adjusting screw for actuating the clamping jaws;

Figs. 6, 7 and 8 are views of one of a pair of clamping jaws; Fig. 6 showing a plan view thereof and Figs. 7 and 8 elevations at right angles to each other.

Figs. 9, 10 and 11 are views of the other clamping jaw; Fig. 9 showing a plan view thereof and Figs. 10 and 11 elevations at right angles to each other.

Fig. 12 is an elevation of a part of a tool used in assembling the clamping jaws and their actuating screw.

Fig. 13 is an elevation of the tool shown in Fig. 12 at right angles to the view in the latter figure with the actuating screw placed in it.

Fig. 14 is a view similar to Fig. 13 with one of the clamping jaws positioned on the screw and Fig. 15 is a plan view of the parts shown in Fig. 14.

Figs. 16 and 17 are views similar to Figs. 14 and 15 with both clamping jaws on the screw.

Figs. 18 and 19 are respectively a side elevation and an end view of a locking plate for the actuating screw.

Fig. 20 is a plan view of the chuck body with the jaw assembly in it clamped to a centering shaft.

Fig. 21 is a sectional side elevation of an adapter and Fig. 22 is a front end elevation of the same.

Fig. 23 is a sectional plan view and Fig. 24 is a side elevation partly in section of the parts shown in Figs. 20, 21 and 22 assembled and mounted on a spindle. A rod is shown clamped in the jaws in Fig. 23.

Fig. 25 is a sectional plan view and Fig. 26 a front elevation of a completely assembled chuck which is made according to the method disclosed herein.

30 designates a cylindrical chuck body through which is a transverse rectangular passage or guide 31.

32 is an axial bore from the front end of the body into the guide 31. 33 is an axial bore from the rear end of the body into the guide.

A slot 34 is cut through the approximate center of the rear end of the body into the guide 31 at right angles to the guide. 35, 35 are threaded holes in the rear end of the body in alinement with the slot 34 and parallel to the axis of the body. These holes pass through the slot into solid parts of the body.

40 is an adjusting screw for actuating the clamping jaws. This screw has a transverse groove 41 intermediate its ends on opposite sides of which are left and right hand threads 42 and 43. 44 is a polygonal hole in one end of the screw for the reception of a wrench.

50 is one of a pair of clamping jaws. This has an internally threaded transverse bore 51 with left hand threads adapted to fit the threads 42 of the adjusting screw and an inwardly extending portion 52 which has two flat inwardly converging surfaces 53, 54.

60 is the other clamping jaw. It has an internally threaded transverse bore 61 with right hand threads adapted to fit threads 43 of the adjusting screw, and an outwardly extending portion 62 which has two flat outwardly converging surfaces 63, 64, meeting on a line 65 with their angle of convergence the same as that of the surfaces 53, 54 of the jaw 50.

The surfaces 53, 54 of the jaw 50 are adapted to engage an article or tool placed in the chuck and the line 65 between the surfaces 63, 64 of the jaw 62 is adapted to engage the article or tool. Because of the fact that different lines on the surfaces 53, 54 will abut articles or tools of different diameters, the threads 42, 51 are of coarser pitch than that of the threads 43, 61, so proportioned as to keep these lines of engagement symmetrical in relation to the line 65 and the axis of the chuck in all of the relative positions of the clamping jaws. As the screw 40 passes through parts of the jaws 50 and 60 and is entirely surrounded thereby, it is possible to use finer pitch threads than could be used if the threads of the screw engaged the sides of the jaws as in former practice. This makes possible a closer adjustment of the jaws on the screw and attaining a greater gripping power.

In carrying out the method of construction disclosed herein, the clamping jaws are assembled on the adjusting screw with the tool engaging lines of contact of the jaw 50 and the line 65 of the jaw 60 about equally spaced from the groove 41. In order to accomplish this result a tool is provided which has a cylindrical shank 46 with a flattened portion 47 of approximately the thickness of the width of the groove 41 extending from the end of the shank (Figs. 12 and 13). 48 is a slot of a width to receive the part of the screw at the base of the groove.

First the screw is inserted in the slot 48, as shown in Fig. 13. Then the jaw 50 is placed on the screw and the screw is rotated until the jaw surfaces 53, 54 abut the shank 46. This condition is illustrated in Figs. 14 and 15. Next the jaw 60 is placed on the other end of the adjusting screw 40 and is rotated thereon until its tool engaging line 65 abuts the tool, as shown in Figs. 16 and 17.

After the jaws have been assembled in this manner the tool is removed and the screw and jaw assembly is inserted laterally in the guide 31 of the chuck body until the groove 41 in the screw is opposite the slot 34 in the chuck body. Then the locking plate 70 which is shown in Figs. 18 and 19 is placed in the slot 34. The locking plate is a flat member preferably of hardened steel of about the thickness of the width of the groove 41 in the screw and of the width of the groove 34 in the body. It is shaped to fit the groove 34 which is conveniently made in the body by a circular saw. Its length is about equal to the distance between the threads of the holes 35, 35. A notch 71 is cut in its rear edge of a length about the same as the diameter of the bore 33 in the body. A slot 72 is cut in its forward edge of such a size as to permit the locking plate to be inserted in the groove 41 of the adjusting screw with the sides of the plate adjacent the slot engaging the sides of the groove. When thus assembled, a rotation of the adjusting screw will move the clamping jaws in the opposite directions and the whole assembly is clamped onto a shaft 75, as shown in Fig. 20.

An essential feature of this invention is that the shaft 75 is a true running shaft and that while the chuck body 30 is attached to it by the clamping jaws 50 and 60 thus supported in the body, the body, or at least a part of it is trued up to be concentric with the axis of the shaft upon which it is supported. Although the whole outer surface of the body may be machined while the body is thus supported on the shaft 75, I prefer to cut a boss 36 of reduced diameter on the rear end of the body and to form a shoulder 37 at right angles to the axis of the shaft and to complete the truing operation in the manner which will now be described.

80 (Figs. 21 and 22) is an adapter, having in the particular form illustrated, an internally threaded axial bore 81 adapted to receive the threaded end 91 of a spindle 90. The front end of the adapter is turned to form a flat surface 82 and an internal cylindrical flange 83 which are adapted to form a close fit with the finished boss 36 and the shoulder 37 on the rear end of the chuck body. The adapter is also provided with diametrically opposed clearance holes 84, 84 spaced apart the same distance as the screw holes 35, 35 in the chuck body and may be countersunk, as shown at 85, 85.

The adapter is affixed to the chuck body by screws 86, 86. The adapter holds the locking plate in the groove 34 and the screws hold it against lateral displacement. While the whole structure is supported on the spindle 90, as shown in Figures 23 and 24, the jaws are clamped onto a plug 77 (Fig. 23) of a diameter equal to the maximum capacity of the chuck. This will bring the rear surfaces 55 and 66 of the clamping jaws into approximate alinement with the outer surface of the chuck body and while the parts are thus assembled they are rotated by the spindle 90 and the outer surfaces of the chuck body and of the clamping jaws ground into true concentricity with the axis of the spindle. A bevel 39 is ground off into true concentricity with the axis of the spindle and if desired the plug 77 may be removed and the front end of the chuck body ground.

I have described my method as used for making a two-jawed chuck which has specific characteristics, but this method can be used for making chucks of other types and other characteristics, and I intend to limit myself only to the features of this method as are specified in the claims.

What is claimed is:

1. The herein described method of making chucks which consists of providing a body with adjustable clamping jaws in and supported by said body, affixing the body to a centralizing member by the engagement of said clamping jaws therewith and then making a part of the outside of the body concentric with the centralizing member while it is affixed thereto.

2. The herein described method of making chucks which consists of providing a body with adjustable clamping jaws in and supported by said body, affixing the body to a centralizing member by the engagement of said clamping jaws therewith, then making a part of the outside of the body concentric with the centralizing member while it is affixed thereto and then affixing an axially symmetrical piece to the concentric part of the body thus formed, by which the body may be supported.

3. The herein described method of making chucks which consists of providing a body with adjustable clamping jaws in and supported by said body, affixing the body to a centralizing member by the engagement of said clamping jaws therewith, then making a part of the outside of the body concentric with the centralizing member while it is affixed thereto, then affixing an axially symmetrical piece to the concentric part of the body thus formed, by which the body may be supported and thereafter making the rest of the outside of the body concentric in relation to the axis of said piece.

4. The herein described method of making chucks which consists of making a transverse guide in a body, placing in said guide an assembly of clamping devices and an actuator therefor, holding said assembly as a whole against transverse movement in the guide, affixing the body to a centralizing member by means of said assembly and then making a part of the body concentric with the centralizing member while it is thus affixed thereto.

5. The hereindescribed method of making chucks which consists of making a transverse guide in a body, placing in said guide an assembly of clamping devices and an actuator therefor, holding said assembly as a whole against transverse movement in the guide, affixing the body to a centralizing member by means of said assembly, making a part of the body concentric with the centralizing member while it is thus affixed thereto, then affixing an axially symmetrical piece to the concentric part of the body thus formed and thereafter making the outside of the body concentric with the axis of said piece.

6. The herein described method of making chucks which consists of making a transverse guide in a body with a locking element near the center of the guide, assembling a pair of clamping devices on an actuator which has a part intermediate the clamping devices thereon arranged to engage the locking element in the guide, placing the assembly in the guide, affixing the body to a centralizing member by means of said assembly and then making at least a part of the body concentric with the centralizing member while it is thus affixed thereto.

7. The herein described method of making chucks which consists of making a transverse guide in a body with a locking element near the center of the guide, assembling a pair of clamping devices on an actuator which has a part intermediate the clamping devices thereon arranged to engage the locking element in the guide, placing the assembly in the guide, affixing the body to a centralizing member by means of said assembly, making a part of the body concentric with the centralizing member while it is thus affixed thereto, then affixing an axially symmetrical piece to the concentric part of the body thus formed and thereafter making the outside of the body concentric with the axis of said piece.

8. The herein described method of making chucks which consists of making a transverse guide in a body with a locking element near the center of the guide, providing a straight line actuator which has a part intermediate its ends arranged to engage the locking element in the guide, individually adjusting each of a pair of clamping devices on the actuator to desired distances from the lock engaging part of the actuator, placing the actuator with the adjusted clamping devices thereon in the guide in the body, affixing the body to a centralizing member by means of the assembled actuator and clamping devices and then making at least a part of the body concentric with the centralizing member while it is thus affixed thereto.

9. The herein described method of making chucks which consists of making a transverse guide in a body with a locking element near the center of the guide, providing a straight line actuator which has a part intermediate its ends arranged to engage the locking element in the guide, individually adjusting each of a pair of clamping devices on the actuator to desired distances from the lock engaging part of the actuator, placing the actuator with the adjusted clamping devices thereon in the guide in the body, affixing the body to a centralizing member by means of the assembled actuator and clamping devices, making a part of the body concentric with the centralizing member while it is thus affixed thereto, then affixing an axially symmetrical piece to the concentric part of the body thus formed and thereafter making the outside of the body concentric with the axis of said piece.

ARTHUR MERRICK STONER.